US012128870B2

(12) United States Patent
Jaccoud et al.

(10) Patent No.: US 12,128,870 B2
(45) Date of Patent: Oct. 29, 2024

(54) HYBRID VEHICLE CREEP CONTROL (71) Applicant: JAGUAR LAND ROVER LIMITED, Coventry (GB)

(72) Inventors: Rodolfo Oliveira Jaccoud, Leamington Spa (GB); Matthew Hancock, Rugby (GB); Olivier Jean Brice Roques, Banbury (GB)

(73) Assignee: Jaguar Land Rover Limited, Coventry (GB)

( * ) Notice: Subject to any disclaimer, the term of this patent is extended or adjusted under 35 U.S.C. 154(b) by 200 days.

(21) Appl. No.: 17/791,702

(22) PCT Filed: Jan. 10, 2021

(86) PCT No.: PCT/EP2021/050321
§ 371 (c)(1),
(2) Date: Jul. 8, 2022

(87) PCT Pub. No.: WO2021/140235
PCT Pub. Date: Jul. 15, 2021

(65) Prior Publication Data
US 2023/0042527 A1    Feb. 9, 2023

(30) Foreign Application Priority Data
Jan. 9, 2020 (GB) .................................... 2000311

(51) Int. Cl.
*B60W 20/11* (2016.01)
*B60K 6/48* (2007.10)
(Continued)

(52) U.S. Cl.
CPC .............. *B60W 20/11* (2016.01); *B60K 6/48* (2013.01); *B60K 6/52* (2013.01); *B60L 15/2063* (2013.01);
(Continued)

(58) Field of Classification Search
CPC ...... B60W 20/11; B60W 20/40; B60W 10/06; B60W 10/08; B60W 30/18063;
(Continued)

(56) References Cited

U.S. PATENT DOCUMENTS 10,967,865 B2 *  4/2021  Zhao ................... B60W 10/06
11,325,577 B2 *  5/2022  Baba ................... B60W 10/02
(Continued)

FOREIGN PATENT DOCUMENTS

JP    2010143418 A    7/2010
JP    2010241325 A    10/2010

OTHER PUBLICATIONS

Combined Search and Examination report corresponding to Great Britain Application No. GB2000311.7, Jul. 8, 2020, 6 pages.
(Continued)

*Primary Examiner* — Huan Le
(74) *Attorney, Agent, or Firm* — Reising Ethington P.C.

(57) ABSTRACT

A method and a control system for controlling movement of a vehicle to provide vehicle creep, the vehicle having an engine and an electric traction motor, and the control system having one or more controllers. The control system is configured to: while a torque path between the engine and a first set of vehicle wheels is disconnected, control the electric traction motor to provide tractive torque to a second set of vehicle wheels to automatically move the vehicle to provide electric vehicle creep. The electric vehicle creep is controlled by a mathematical model of engine creep torque that would be provided by the engine when the torque path between the engine and the first set of vehicle wheels is connected.

20 Claims, 4 Drawing Sheets (51) Int. Cl.
*B60K 6/52* (2007.10)
*B60L 15/20* (2006.01)
*B60W 10/06* (2006.01)
*B60W 10/08* (2006.01)
*B60W 20/40* (2016.01)
*B60W 30/18* (2012.01)
*B60W 40/105* (2012.01)
*B60W 50/00* (2006.01)

(52) U.S. Cl.
CPC ............ *B60W 10/06* (2013.01); *B60W 10/08* (2013.01); *B60W 20/40* (2013.01); *B60W 30/18063* (2013.01); *B60W 40/105* (2013.01); *B60L 2240/421* (2013.01); *B60L 2240/423* (2013.01); *B60W 2050/0039* (2013.01); *B60W 2510/0208* (2013.01); *B60W 2510/081* (2013.01); *B60W 2510/083* (2013.01); *B60W 2510/087* (2013.01); *B60W 2710/083* (2013.01); *B60Y 2300/18058* (2013.01)

(58) Field of Classification Search
CPC ....... B60W 40/105; B60W 2050/0039; B60W 2510/0208; B60W 2510/081; B60W 2510/083; B60W 2510/087; B60W 2710/083

See application file for complete search history.

(56) References Cited

U.S. PATENT DOCUMENTS

| | | |
|---|---|---|
| 2006/0078416 A1 | 4/2006 | Haworth |
| 2014/0025244 A1 | 1/2014 | Hancock et al. |
| 2016/0060443 A1 | 3/2016 | Hoya et al. |
| 2016/0297425 A1* | 10/2016 | Sato ............... B60W 10/08 |
| 2018/0099673 A1 | 4/2018 | Pedlar et al. |
| 2019/0111928 A1 | 4/2019 | Son et al. |

OTHER PUBLICATIONS

International Search Report corresponding to International Application No. PCT/EP2021/050321, dated Feb. 22, 2021, 4 pages.
Written Opinion corresponding to International Application No. PCT/EP2020/082414, dated Feb. 22, 2021, 6 pages.
Written Opinion corresponding to International Application No. PCT/EP2021/050321, dated Feb. 22, 2021, 6 pages.
Japanese Office Action corresponding to application 2022-542296, dated May 17, 2023, 11 pages.

* cited by examiner

HYBRID VEHICLE CREEP CONTROL

TECHNICAL FIELD

The present disclosure relates to a hybrid vehicle control system and method. In particular, but not exclusively it relates to a hybrid vehicle control system and method for controlling movement of a vehicle to provide vehicle creep.

BACKGROUND

Different vehicle powertrains have different characteristics. The phenomenon of vehicle creep occurs in vehicles that comprise torque converters in a torque path between a prime mover (torque source) such as an internal combustion engine (engine), and the vehicle wheels. Vehicle creep causes vehicles to move while the torque path is connected, while the engine is at idle.

Vehicle creep occurs due to the design of torque converters. Torque converters comprise an impeller connected to the engine, a turbine connected to the vehicle wheels, and a stator therebetween. The turbine and the impeller are coupled together by a fluid coupling. During engine idling with the vehicle on level ground, a lock-up clutch for eliminating slip between the impeller and the turbine is generally open. Therefore, the impeller rotates at engine idle speed, and the turbine is allowed to rotate at a slower speed or not rotate at all. The fluid coupling causes the engine-speed-dependent rotation of the impeller to impart a dragging torque on the turbine. The stator multiplies (increases) the torque acting on the turbine when the impeller is rotating faster than the turbine. If the vehicle is unbraked and on level ground, the turbine torque is generally sufficient to rotate the turbine to a speed approaching (but not reaching) the impeller speed, causing the vehicle to creep forwards, generally up to 2-5 kilometres per hour.

The creep speed depends on the speed of the impeller (engine idle speed) and on any resistance to turbine-rotation such as slopes or friction braking. For example, upon reaching an up-slope, the creep speed (vehicle speed during vehicle creep) may drop to a standstill. The creep speed also depends on geometric and fluid properties of the individual torque converter. The fluid properties may vary in operation and include temperature, pressure, etc.

In an electric or hybrid electric vehicle powertrain, one or more electric traction motors are used to contribute at least some tractive output torque ('torque' herein), to reduce or eliminate use of the engine and therefore to reduce fuel consumption and emissions. The phenomenon of vehicle creep may not occur during electric driving. For example, a torque path between an electric traction motor and the vehicle wheels may not require a torque converter. A synthetic creep function could be added to ensure the vehicle moves forward at a constant creep speed or with constant torque, but such a creep function does not accurately replicate the behaviour of a torque converter. This means that the vehicle creep behavior varies depending on whether the vehicle is powered by the engine or the electric traction motor. This variation may reduce the driver's ability to anticipate the behavior of the vehicle close to creep speeds and on gradients.

SUMMARY OF THE INVENTION

It is an aim of the present invention to address one or more disadvantages associated with the prior art, to provide a vehicle that is easier to control.

Aspects and embodiments of the invention provide a control system, a vehicle, a method, and computer software, as claimed in the appended claims.

According to an aspect of the invention there is provided a control system for controlling movement of a vehicle to provide vehicle creep, the vehicle comprising an engine and an electric traction motor, the control system comprising one or more controllers, wherein the control system is configured to: while a torque path between the engine and a first set of vehicle wheels is disconnected, control the electric traction motor to provide tractive torque to a second set of vehicle wheels to automatically move the vehicle to provide electric vehicle creep, wherein the electric vehicle creep is controlled by a mathematical model of engine creep torque that would be provided by the engine when the torque path between the engine and the first set of vehicle wheels is connected.

The mathematical model is also referred to herein as a vehicle creep function, or synthetic vehicle creep function.

An advantage is that it improves vehicle composure and maintains the same vehicle behavior irrespective of the operating mode of a hybrid vehicle. This is because a vehicle creep function is available in both engine-driving and electric-driving situations and therefore the driver experiences consistent vehicle behaviour. The synthetic vehicle creep function for electric-driving at least partially replicates the behaviour of a torque converter, because the torque is controlled to enable an external environment (e.g. up-slope) to slow the vehicle automatically when required. Similarly, the synthetic vehicle creep function controls the torque to enable a down-slope to automatically speed the vehicle when required. It should be noted that the meaning of up-slope and down-slope is relative to the selected driving direction.

The control system may be configured to control the electric traction motor to provide the tractive torque while the torque path is disconnected and the engine is in a deactivated state. An advantage is that the electric vehicle creep is available in efficient electric-only driving situations. A further benefit of the electric vehicle creep maintaining the same vehicle behaviour is that a vehicle speed does not change as the torque path is reconnected and the engine enters an activated state to provide, at least in part, natural vehicle creep, even if the vehicle is on a slope.

The mathematical model may be dependent on vehicle speed. The automatically moving the vehicle may comprise controlling the tractive torque of the electric traction motor to reduce a difference between the vehicle speed and a vehicle creep speed target determined by the mathematical model.

The mathematical model may be configured to limit the tractive torque of the electric traction motor, based on the modelled engine creep torque, to enable an external environment to slow the vehicle. Controlling the tractive torque to enable an external environment to slow the vehicle may comprise saturating the tractive torque of the electric traction motor to a torque limit determined by the mathematical model, wherein the torque limit is configured to enable the vehicle speed to reach the vehicle creep speed target when the vehicle is on level ground and is configured to cause the vehicle speed to be incapable of reaching or maintaining the vehicle creep speed target when the vehicle is on an up-slope, or for the vehicle speed to be held at zero by an up-slope which happens to be at the exact required slope to balance the torque limit, or for the vehicle speed to become negative if the up-slope is steeper than torque limit can overcome. An advantage is that the electric vehicle creep better replicates the behaviour of a torque converter, by allowing the vehicle to automatically slow, stop or run backwards on up-slopes. It should be noted that the scenarios described above may not occur in practice due to other overriding vehicle systems which inhibit the vehicle from running backwards when in a forward gear. Similar scenarios will occur when reversing, in which case an 'up-slope' is one in which the vehicle ascends while driving backwards.

The mathematical model may be dependent on at least one of: ambient temperature; operating temperature; ambient pressure; humidity; or engine accessory load. For example, the mathematical model may be dependent on an operating temperature associated with torque converter fluid. An advantage is that the electric-driving vehicle creep better replicates the behaviour of a torque converter, by modulating the creep based on sensed variables that affect engine idle speed and/or torque converter fluid properties.

The mathematical model may be dependent on a simulated engine idle speed variable. An advantage is better replicating the behaviour of the engine and torque converter, because engine idle speed may vary dependent on conditions.

The mathematical model may be dependent on one of a difference between, and a ratio between, the simulated engine idle speed variable and a vehicle speed variable. The mathematical model may be dependent on a simulated torque converter characteristic dependent on said difference or said ratio. An advantage is better replicating the behaviour of the torque converter, because a torque converter's capacity and torque multiplication depend on this ratio.

The mathematical model may be dependent on one or both of: an operating temperature associated with torque converter fluid, and a simulated gear ratio for an automatic transmission operable to provide vehicle creep in different forward gears and/or in different reverse gears. An advantage is better replicating the behaviour of engine-driven vehicle creep.

The vehicle creep speed target may be a function of at least: simulated engine idle speed; simulated automatic transmission ratio; differential ratio; and wheel size. The torque limit may be a function of at least: the vehicle creep speed target; vehicle speed; simulated automatic transmission ratio; and a torque converter transfer function that emulates, as a function of slip ratio, capacity factor and/or torque ratio and/or torque converter efficiency. For example, the torque limit may be defined according to the equation:

Torque limit=(Vehicle Creep Speed Target/Vehicle Speed)^2*Torque Converter Transfer Function*Automatic Transmission Ratio.

The control system may be configured to: receive a signal indicative of a requirement to transition the engine from a first mode to a second mode during electric vehicle creep, wherein in the first mode the engine is in a deactivated state and the torque path is disconnected and the electric traction motor provides electric vehicle creep, and wherein in the second mode the engine is in an activated state and the torque path is connected and the engine provides, at least in part, vehicle creep; and cause connection of the torque path and activation of the engine in dependence on receiving the signal. The first mode may be an electric vehicle mode and the second mode may be a hybrid electric vehicle mode or an engine-only vehicle mode. An advantage is that vehicle creep may continue smoothly in engine-driving situations (second mode), electric-driving situations (first mode), and during mode-transitions.

In the hybrid electric vehicle mode the electric traction motor may be operable to provide tractive torque to the second set of vehicle wheels. An advantage is four-wheel drive vehicle creep for improved traction, because the engine drives the first set of wheels and the electric traction motor drives the second set of wheels. The control system may be configured to control the electric traction motor to increase tractive torque in response to falling vehicle speed causing engine speed to fall below an engine idle speed target. An advantage is that the electric traction motor only assists when required.

In one example, the first set of vehicle wheels are front wheels and the second set of vehicle wheels are rear wheels. In another example, the first set of vehicle wheels are rear wheels and the second set of vehicle wheels are front wheels.

According to another aspect of the invention there is provided a vehicle comprising the control system, the engine and the electric traction motor. The vehicle may comprise a fluid-coupling torque converter in the torque path between the engine and the first set of vehicle wheels.

According to another aspect of the invention there is provided a method of controlling an engine and an electric traction motor of a vehicle, the method comprising: while a torque path between the engine and a first set of vehicle wheels is disconnected, controlling the electric traction motor to provide tractive torque to a second set of vehicle wheels to automatically move the vehicle to provide electric vehicle creep, wherein the electric vehicle creep is controlled by a mathematical model of engine creep torque that would be provided by the engine when the torque path between the engine and the first set of vehicle wheels is connected.

According to another aspect of the invention there is provided computer software that, when executed, is arranged to perform any one or more of the methods described herein.

According to a further aspect of the invention there is provided a non-transitory computer readable medium comprising computer readable instructions that, when executed by a processor, cause performance of any one or more of the methods described herein.

According to another aspect of the invention there is provided a control system configured to perform any one or more of the methods described herein.

The one or more controllers as described herein may collectively comprise: at least one electronic processor having an electrical input for receiving information as described herein; and at least one electronic memory device electrically coupled to the at least one electronic processor and having instructions stored therein; and wherein the at least one electronic processor is configured to access the at least one memory device and execute the instructions thereon so as to cause the control system to control the engine and/or the electric traction motor in dependence on the information.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
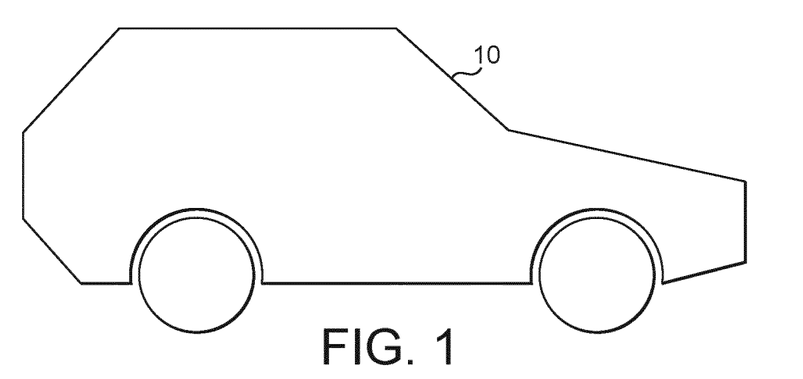
FIG. 1 illustrates an example of a vehicle.

FIG. 1 illustrates an example of a vehicle 10 in which embodiments of the invention can be implemented. In some, but not necessarily all examples, the vehicle 10 is a passenger vehicle, also referred to as a passenger car or as an automobile. In other examples, embodiments of the invention can be implemented for other applications, such as industrial vehicles.

The vehicle 10 may be a hybrid electric vehicle (HEV) having an electric-only mode of propulsion among other modes of propulsion. The HEV may be configured to operate as a parallel HEV. Parallel HEVs comprise a torque path between the engine and at least one vehicle wheel, as well as a torque path between an electric traction motor and at least one vehicle wheel. The torque path(s) may be disconnectable by a torque path connector such as a clutch. Parallel HEVs differ from series HEVs, because in series HEVs the purpose of the engine is to generate electrical energy and there is no torque path between the engine and vehicle wheels.

Figure 2:
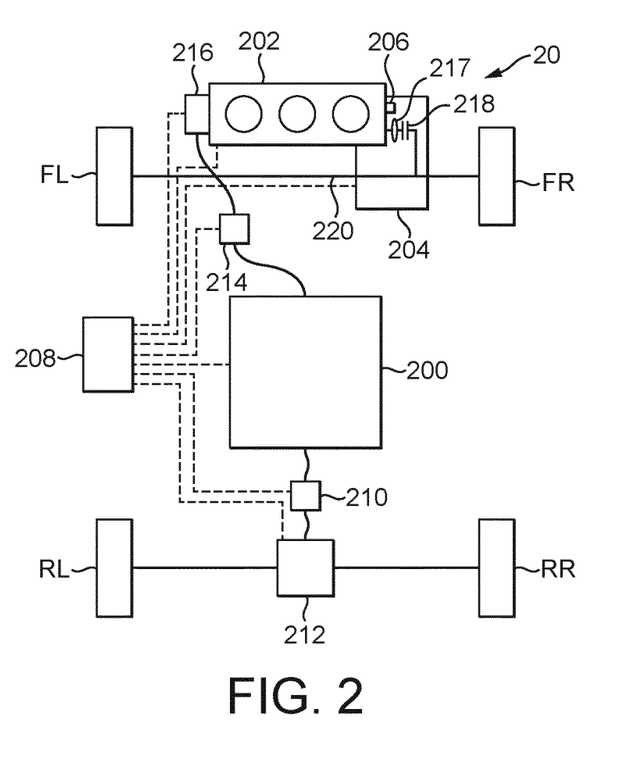
FIG. 2 illustrates an example of a system.

FIG. 2 illustrates a system 20 for a parallel HEV 10. The system 20 defines, at least in part, a powertrain of the HEV.

The system 20 comprises a control system 208. The control system 208 comprises one or more controllers. The control system 208 may comprise one or more of: a hybrid powertrain control module; an engine control unit; a transmission control unit; a traction battery management system; and/or the like.

The system 20 comprises an engine 202. The engine 202 is a combustion engine. The illustrated engine 202 is an internal combustion engine. The illustrated engine 202 comprises three combustion chambers, however a different number of combustion chambers may be provided in other examples.

The engine 202 is operably coupled to the control system 208 to enable the control system 208 to control output torque of the engine 202. The output torque of the engine 202 may be controlled by controlling one or more of: air-fuel ratio; spark timing; poppet valve lift; poppet valve timing; throttle opening position; fuel pressure; turbocharger boost pressure; and/or the like, depending on the type of engine 202.

The system 20 comprises an optional pinion starter 206 for starting the engine 202.

The system 20 comprises a vehicle transmission arrangement 204 for receiving output torque from the engine 202. The vehicle transmission arrangement 204 may comprise an automatic vehicle transmission or a semi-automatic vehicle transmission. The vehicle transmission arrangement 204 comprises a fluid-coupling torque converter 217 between the engine 202 and a gear train.

The system 20 may comprise a differential (not shown) for receiving output torque from the gear train. The differential may be integrated into the vehicle transmission arrangement 204 as a transaxle, or provided separately.

The engine 202 is mechanically connected or connectable to a first set of vehicle wheels (FL, FR) via a torque path 220. The torque path 220 extends from an output of the engine 202 to the vehicle transmission arrangement 204, then to axles/driveshafts, and then to the first set of vehicle wheels (FL, FR). In a vehicle overrun and/or friction braking situation, torque may flow from the first set of vehicle wheels (FL, FR) to the engine 202. Torque flow towards the first set of vehicle wheels (FL, FR) is positive torque, and torque flow from the first set of vehicle wheels (FL, FR) is negative torque.

The illustrated first set of vehicle wheels (FL, FR) comprises front wheels, and the axles are front transverse axles. Therefore, the system 20 is configured for front wheel drive by the engine 202. In another example, the first set of vehicle wheels (FL, FR) comprises rear wheels. The illustrated first set of vehicle wheels (FL, FR) is a pair of vehicle wheels, however a different number of vehicle wheels could be provided in other examples.

In the illustrated system 20, no longitudinal (centre) driveshaft is provided, to make room for hybrid vehicle components.

Therefore, the engine 202 is not connectable to a second set of rear wheels (rear wheels RL, RR in the illustration). The engine 202 may be transverse mounted to save space. In an alternative example, the engine 202 may be configured to drive the front and rear wheels.

A torque path connector 218 such as a clutch is provided inside and/or outside a bell housing of the vehicle transmission arrangement 204. The clutch 218 is configured to connect and configured to disconnect the torque path 220 between the engine 202 and the first set of vehicle wheels (FL, FR). The system 20 may be configured to automatically actuate the clutch 218 without user intervention.

The system 20 comprises a first electric traction motor 216. The first electric traction motor 216 may be an alternating current induction motor or a permanent magnet motor, or another type of motor. The first electric traction motor 216 is located to the engine side of the clutch 218.

The first electric traction motor 216 may be mechanically coupled to the engine 202 via a belt or chain. For example, the first electric traction motor 216 may be a belt integrated starter generator. In the illustration, the first electric traction motor 216 is located at an accessory drive end of the engine 202, opposite a vehicle transmission end of the engine 202. In an alternative example, the first electric traction motor 216 is a crankshaft integrated motor generator, located at a vehicle transmission end of the engine 202.

The first electric traction motor 216 is configured to apply positive torque and configured to apply negative torque to a crankshaft of the engine 202, for example to provide functions such as: boosting output torque of the engine 202; deactivating (shutting off) the engine 202 while at a stop or coasting; activating (starting) the engine 202; and regenerative braking in a regeneration mode. In a hybrid electric vehicle mode, the engine 202 and first electric traction motor 216 are both operable to supply positive torque simultaneously to boost output torque. The first electric traction motor 216 may be incapable of sustained electric-only driving.

However, when the torque path 220 between the engine 202 and the first set of vehicle wheels (FL, FR) is disconnected, a torque path 220 between the first electric traction motor 216 and the first set of vehicle wheels (FL, FR) is also disconnected.

FIG. 2 illustrates a second electric traction motor 212 configured to enable at least an electric vehicle mode comprising electric-only driving. In some, but not necessarily all examples, a nominal maximum torque of the second electric traction motor 212 is greater than a nominal maximum torque of the first electric traction motor 216.

Even if the torque path 220 between the engine 202 and the first set of vehicle wheels (FL, FR) is disconnected by the clutch 218, the vehicle 10 can be driven in electric vehicle mode because the second electric traction motor 212 is connected to at least one vehicle wheel.

The illustrated second electric traction motor 212 is configured to provide torque to the illustrated second set of vehicle wheels (RL, RR). The second set of vehicle wheels (RL, RR) comprises vehicle wheels not from the first set of vehicle wheels (FL, FR). The illustrated second set of vehicle wheels (RL, RR) comprises rear wheels, and the second electric traction motor 212 is operable to provide torque to the rear wheels RL, RR via rear transverse axles. Therefore, the vehicle 10 is rear wheel driven in electric vehicle mode. In an alternative example, the second set of vehicle wheels comprises at least one vehicle wheel of the first set of vehicle wheels.

The control system 208 may be configured to disconnect the torque path 220 between the engine 202 and the first set of vehicle wheels (FL, FR) in electric vehicle mode, to reduce parasitic pumping energy losses. For example, the clutch 218 may be opened. In the example of FIG. 2, this means that the first electric traction motor 216 will also be disconnected from the first set of vehicle wheels (FL, FR).

Another benefit of the second electric traction motor 212 is that the second electric traction motor 212 may also be configured to operable in a hybrid electric vehicle mode, to enable four-wheel drive operation despite the absence of a centre driveshaft.

In order to store electrical power for the electric traction motors, the system 20 comprises a traction battery 200. The traction battery 200 provides a nominal voltage required by electrical power users such as the electric traction motors. If the electric traction motors run at different voltages, DC-DC converters (not shown) or the like may be provided to convert voltages.

The traction battery 200 may be a high voltage battery. High voltage traction batteries provide nominal voltages in the hundreds of volts, as opposed to traction batteries for mild HEVs which provide nominal voltages in the tens of volts. The traction battery 200 may have a voltage and capacity to support electric only driving for sustained distances. The traction battery 200 may have a capacity of several kilowatt-hours, to maximise range. The capacity may be in the tens of kilowatt-hours, or even over a hundred kilowatt-hours.

Although the traction battery 200 is illustrated as one entity, the function of the traction battery 200 could be implemented using a plurality of small traction batteries in different locations on the vehicle 10.

In some examples, the first electric traction motor 216 and second electric traction motor 212 may be configured to receive electrical energy from the same traction battery 200. By pairing the first (mild) electric traction motor 216 to a high-capacity battery (tens to hundreds of kilowatt-hours), the first electric traction motor 216 may be able to provide the functionality of the methods described herein for sustained periods of time, rather than for short bursts. In another example, the electric traction motors 212, 216 may be paired to different traction batteries.

Finally, the illustrated system 20 comprises inverters. Two inverters 210, 214 are shown, one for each electric traction motor.

In other examples, one inverter or more than two inverters could be provided.

In an alternative implementation, the vehicle 10 may be other than shown in FIG. 2.

Figure 3A:
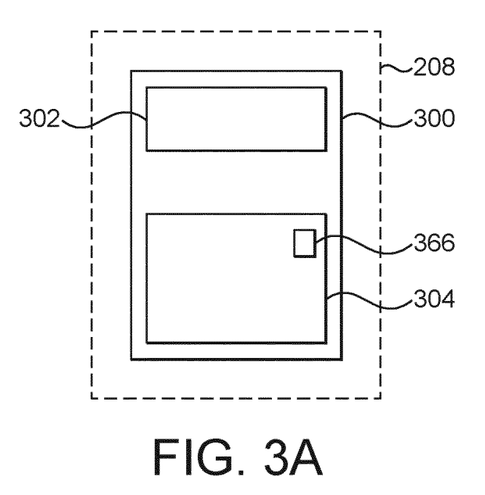
FIG. 3A illustrates an example of a control system and FIG. 3B illustrates an example of a non-transitory computer-readable storage medium.

FIG. 3A illustrates how the control system 208 may be implemented. The control system 208 of FIG. 3A illustrates a controller 300. In other examples, the control system 208 may comprise a plurality of controllers on-board and/or off-board the vehicle 10.

The controller 300 of FIG. 3A includes at least one electronic processor 302; and at least one electronic memory device 304 electrically coupled to the electronic processor 302 and having instructions 306 (e.g. a computer program) stored therein, the at least one electronic memory device 304 and the instructions 306 configured to, with the at least one electronic processor 302, cause any one or more of the methods described herein to be performed.

Figure 3B:
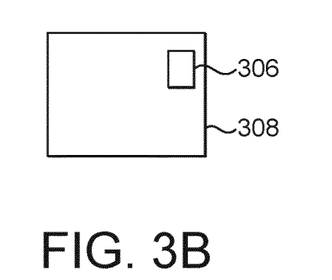

FIG. 3B illustrates a non-transitory computer-readable storage medium 308 comprising the instructions 306 (computer software).

The control system 208 may be configured to provide controller outputs to manipulate a variable (torque) towards a setpoint. An example setpoint is at least one torque target. The at least one torque target may be normally based on torque demand such as driver torque demand (e.g. accelerator pedal depression, APD), an autonomous driving torque demand, or a cruise control torque demand. The at least one torque target may normally be proportional to torque demand. The torque target may comprise an engine torque target for controlling output torque of the engine. The torque target may comprise an electric traction motor torque target for controlling output torque of an electric traction motor.

Another example setpoint is a speed target. Speed targets may comprise an engine speed target such as an engine idle speed target, a vehicle speed target, or an electric traction motor speed target. Torque from the engine and/or an electric traction motor may be controlled to match speed to the speed target, used during idling, vehicle creep, cruise control or other scenarios.

A system 20 such as the powertrain of FIG. 2 can be operated in a plurality of modes. In one mode, the engine 202 is deactivated and the torque path 220 between the engine 202 and the first set of vehicle wheels (FL, FR) is disconnected. In another mode, the engine 202 is re-activated and the torque path 220 is re-connected.

Figure 4:
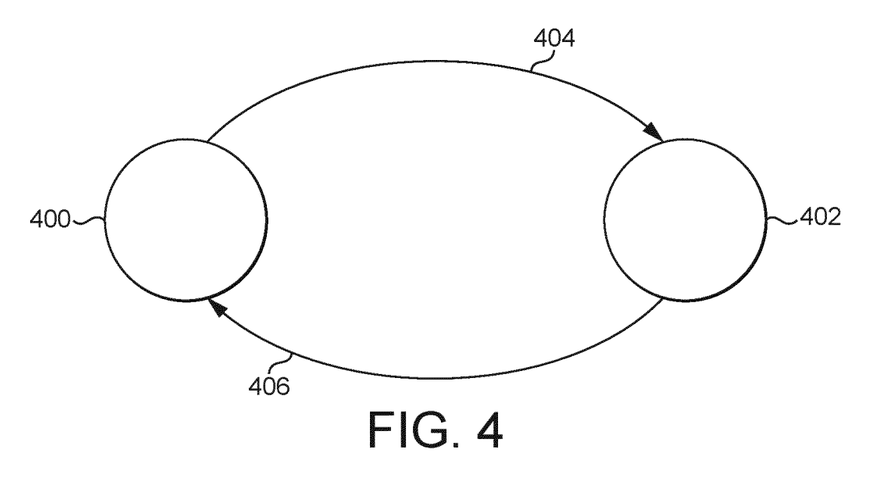
FIG. 4 illustrates an example of a state diagram for switching between two modes.

FIG. 4 illustrates a state diagram of modes of operation. The state diagram shows a first mode 400 and a second mode 402.

In the first mode 400, the engine 202 is in a deactivated state and the torque path 220 between the first set of vehicle wheels (FL, FR) and the engine 202 and first electric traction motor 216 is disconnected. In an example, the effect of the combined deactivation and disconnection is that engine speed falls towards zero. Deactivation relates to the engine 202 producing no positive output torque or insufficient positive output torque for a non-zero engine speed. Fuel injection may cease, to reduce fuel consumption.

In the second mode 402, the engine 202 is in an activated state and the torque path 220 is connected. In the activated state, fuel is combusted in the engine's combustion chambers, causing the engine 202 to provide positive output torque to the torque path 220.

In some examples, the first mode 400 is the above-described electric vehicle mode and the second mode 402 is the hybrid electric vehicle mode.

The state diagram illustrates a first transition condition 404 for transitioning from the first mode 400 to the second mode 402. The state diagram illustrates a second transition condition 406 for transitioning from the second mode 402 to the first mode 400.

The first transition condition 404 may require at least one of: a manual user selection; a traction battery state of charge falling below a threshold; torque demand rising above a threshold (e.g. kickdown function); a temperature being below a threshold (e.g. freezing weather); a change of driving dynamics mode; a change of terrain response mode; and/or the like.

The second transition condition 406 may require at least one of: a manual user selection; a traction battery state of charge rising above a threshold; torque demand falling below a threshold; a temperature being above a threshold; a change of driving dynamics mode; a change of terrain response mode; and/or the like.

A driving dynamics mode refers to a mode that configures one or more of: a suspension setting; a throttle response setting; a gear shift point setting; or a steering weighting setting. A terrain response mode refers to a mode that configures one or more of: a differential locking setting; a traction control setting. There may be overlap between driving dynamics modes and terrain response modes. The settings may be predetermined or configurable.

A manual user selection may comprise use of a human-machine interface input device. The input device may comprise an engine start button. The input device may comprise a driving dynamics mode selector. The input device may comprise a terrain response mode selector. In some examples, a terrain response mode and/or driving dynamics mode may be changeable automatically.

In some examples, the first mode 400 is a gliding mode and the second mode 402 is a non-gliding mode. Gliding refers to deactivation and disconnection of the engine 202 while the vehicle 10 is moving without stopping, to reduce fuel consumption and pumping losses. The first transition condition 404 may require an above-threshold torque demand. The second transition condition 406 may require a below-threshold torque demand for an above-threshold time while the vehicle 10 is moving, for example. Gliding mode transitions are capable of being performed while the vehicle 10 is not braking. Gliding mode transitions are capable of being performed while the vehicle 10 is cruising at significant speeds, such as above 30 kilometres per hour.

In some, but not necessarily all examples, the vehicle 10 comprises terrain-dependent modes such as the above-described terrain response modes. The first mode 400 is a terrain-dependent mode and the second mode 402 is another terrain-dependent mode. Some terrain response modes require the engine 202 to be connected and activated, for example off-road related terrain response modes.

Figure 7:
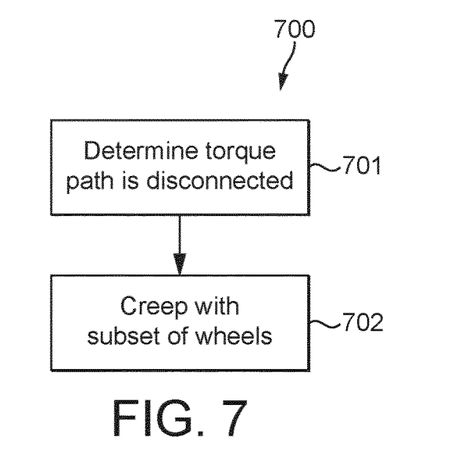
FIG. 7 illustrates an example of a method.

According to an aspect of the invention, the control system 208 is configured to improve vehicle creep behaviour (FIGS. 5A-6B), by performing a method 700 (FIG. 7) comprising:

while the torque path 220 between the engine 202 and the first set of vehicle wheels is disconnected (block 701), controlling the second electric traction motor 212 to provide tractive torque to the second set of vehicle wheels to automatically move the vehicle 10 to provide electric vehicle creep, wherein the electric vehicle creep is controlled by a mathematical model of engine creep torque that would be provided by the engine 202 when the torque path between the engine 202 and the first set of vehicle wheels is connected.

Block 701 may comprise determining that the torque path 220 is disconnected. In some, but not necessarily all examples block 701 comprises determining that an electric vehicle creep condition (entry condition) for providing electric vehicle creep is satisfied. For example, satisfaction of the electric vehicle creep condition may require the torque path 220 to be disconnected (specific mode). Satisfaction may depend on vehicle speed and/or torque demand, so that electric vehicle creep is only provided when the vehicle is moving slowly and/or torque demand is below a threshold/absent. Block 702 is performed in response to satisfaction of the electric vehicle creep condition. Block 702 may be terminated in response to an exit condition such as a mode change and/or increased torque demand and/or increased vehicle speed, for example.

Figure 5A:
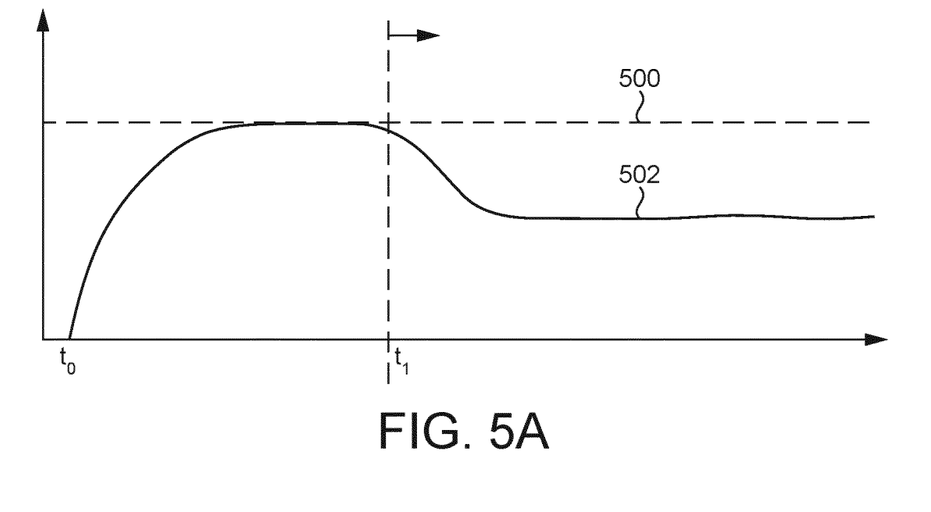
FIG. 5A illustrates an example of a graph with speed and time axes.
Figure 5B:
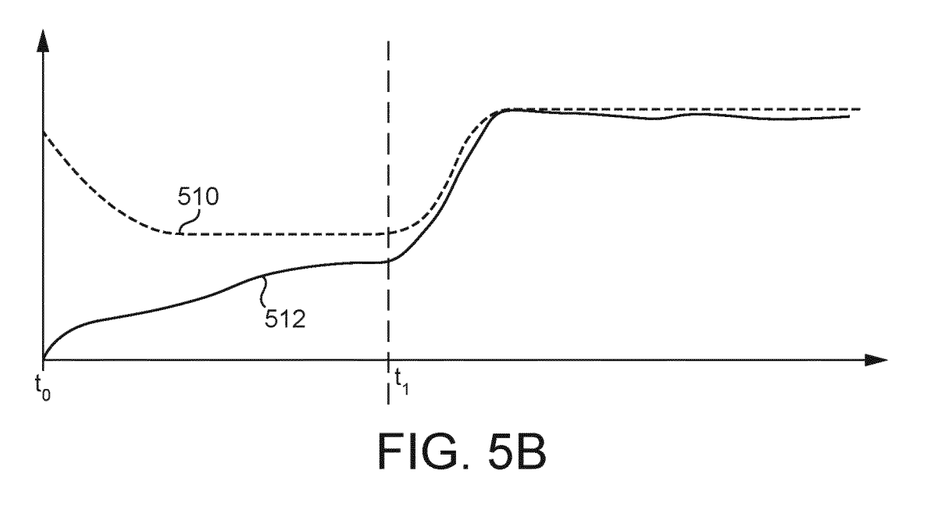
FIG. 5B illustrates an example of a graph with torque and time axes.

FIGS. 5A to 5B illustrate graphs of vehicle speed and torque, controlled according to an example implementation of the above method. Between marked times t0 and t1 in FIGS. 5A and 5B, the vehicle 10 is travelling on level ground. From marked time t1 onwards, the vehicle 10 starts climbing an uphill slope.

In the following description of FIGS. 5A to 5B, the vehicle 10 is in the electric vehicle mode. Therefore, the engine 202 is in a deactivated state and the engine's torque path 220 is disconnected.

FIG. 5A illustrates in the y-axis the magnitude of a manipulated variable (vehicle speed) controlled according to the method, as a solid line curve 502, against time in the x-axis. FIG. 5A also illustrates the magnitude of a setpoint (vehicle creep speed target) using a dashed line 500.

FIG. 5B illustrates in the y-axis the magnitude of a torque request determined based on the difference between vehicle speed and the setpoint, as a solid line curve 512, against time in the x-axis. In the electric vehicle mode, the torque request may determine the tractive torque to be provided by the second electric traction motor 212. FIG. 5B also illustrates in the y-axis the magnitude of a torque limit, as a dashed line 510, against time in the x-axis. The final torque request provided to the second electric traction motor 212 is saturated to the torque limit, when the torque request would otherwise exceed the torque limit. The torque limit is capable of causing the vehicle 10 to automatically slow down when appropriate, during vehicle creep.

From time t0, the control system 208 implements a vehicle creep function. The vehicle creep function provides electric vehicle creep. The vehicle creep function comprises a mathematical model of engine creep torque that would be provided by the engine when the torque path 220 between the engine 202 and the first set of vehicle wheels (FL, FR) is connected. The electric vehicle creep therefore approximately replicates the behaviour that would be expected if the engine 202 were connected to vehicle wheels. The control system 208 may be configured to determine whether to activate the vehicle creep function based on variables such as APD and/or vehicle speed.

In an implementation, the control system 208 may be configured to activate the vehicle creep function only if a vehicle creep condition is satisfied. Satisfaction of the vehicle creep condition may require at least a below-threshold APD, such as zero APD. Satisfaction of the vehicle creep condition may require at least one torque path between vehicle wheel(s) and an engine/electric traction motor to be connected. Satisfaction of the vehicle creep condition may require the clutch 218 to be closed. Satisfaction of the vehicle creep condition may require a below-threshold vehicle speed. Satisfaction of the vehicle creep condition may depend on whether a user has enabled the vehicle creep function.

When active, the vehicle creep function determines a setpoint (e.g. vehicle creep speed target 500 in FIG. 5A). The setpoint may be constant or variable. The setpoint may be calculated based on various factors. For example, the setpoint may based on simulated engine idle speed.

By simulating the engine idle speed, the second electric traction motor 212 can match the creep speed that would be achieved by the engine 202 and the torque converter 217 if the torque path 220 were connected. The engine idle speed is simulated because the engine 202 is in a deactivated state, so engine idle speed cannot be measured.

The simulated engine idle speed may be obtained from an engine control unit, and may correspond to a setpoint engine idle speed that would be required by the engine control unit if the engine 202 were activated and idling. In other words, the engine control unit may continue to calculate an engine idle speed setpoint even though the engine 202 is not active.

A simulated engine idle speed variable may vary based on measurable variables that would operationally cause engine idle speed to vary, for example within an idling range 500 rpm to 1000 rpm. Such measurable variables include, for example, ambient temperature outside the vehicle 10, altitude (ambient temperature and/or ambient pressure outside the vehicle 10), operating temperature (e.g. engine oil temperature and/or engine coolant temperature and/or traction battery temperature), engine status, and engine accessory loads such as air conditioning load, power steering load, etc. Therefore, the electric vehicle creep of the present method may be dependent on measurement of at least one of the above variables.

The setpoint 500 of FIG. 5A may require a vehicle creep speed that would be identical to the vehicle creep speed that would be achievable by the idling engine 202 and the torque converter 217 on level ground. This is to ensure no sudden change in vehicle speed if the vehicle 10 transitions from electric vehicle mode to hybrid electric vehicle mode or engine-only mode on level ground.

The setpoint may also be calculated in dependence on gear reductions in the engine torque path 220 to the first set of vehicle wheels.

Equation (1) below describes how the setpoint could be calculated:

$$\text{Vehicle creep speed target(setpoint)} = \text{Simulated Engine Idle Speed Variable} * \text{Automatic Transmission Ratio} * \text{Differential Ratio} * \text{Wheel Size} \quad (1)$$

The simulated engine idle speed variable is defined above. The automatic transmission ratio is a simulated gear ratio corresponding to which one of a plurality of forward gears (or reverse gears) available for vehicle creep the automatic vehicle transmission would be engaged in if the vehicle creep was engine-driven. The differential ratio is the ratio of the differential that couples the automatic vehicle transmission output to the first set of vehicle wheels. Wheel size is a circumference of the first set of vehicle wheels including the tyre.

Once the setpoint is known, the control system 208 may implement a control algorithm such as a proportional-integral-derivative (PID) method, to determine the torque required from the second electric traction motor 212, to achieve the vehicle creep speed target.

As illustrated in FIGS. 5A and 5B, the implementation of the setpoint 500 causes the torque request 512 to be modulated to increase the vehicle speed 502 towards the setpoint 500.

The above technique accurately replicates torque converter creep behaviour in several scenarios including driving on level ground. However, in order to fully replicate the behaviour of a torque converter 217, it would be advantageous to provide further means of automatically slowing the vehicle 10 when resistance to vehicle motion increases, such as when the vehicle 10 is braked or enters an uphill gradient. Further, torque converters have complex nonlinear characteristics such as slip-dependent torque multiplication, which should also be replicated.

FIG. 5B illustrates a variable torque limit 510 configured to enforce torque converter-like behaviour. Between times t0-t1, the torque limit is higher than the torque request, to enable the vehicle speed 502 to reach the vehicle creep speed target 500. However, after time t1 the vehicle 10 is on an up-slope, and the torque limit is no longer sufficiently high to enable the vehicle speed 502 to reach the vehicle creep speed target 500. This causes the vehicle speed 502 to be incapable of reaching or incapable of being maintained at the vehicle creep speed setpoint 500.

At time t1, the vehicle speed 502 starts decreasing due to the up-slope. The illustrated torque limit 510 increases in dependence on the decrease in vehicle speed 502, in order to replicate the variable torque multiplication characteristics of torque converters, however the increase is not sufficient for the vehicle speed to reach or remain at the vehicle creep speed target 500. In analogy to the above, the torque limit may be decreased if vehicle speed rises. Although not shown, the requested torque may be reduced to prevent the electric traction motor 212 from fighting against vehicle friction brakes, for example when vehicle speed is zero.

The calculated torque limit is dependent on the turbine speed (vehicle speed) and on impeller speed (the simulated engine idle-speed variable). The torque limit may be dependent on a difference/ratio between the impeller speed (simulated engine idle speed variable) and the turbine speed (vehicle speed). The ratio is therefore a slip rate of the impeller and the turbine relative to each other, also expressed as speed ratio. For a speed ratio of 1, there is no slip. For a speed ratio of 0, there is 100% slip. The torque limit may increase when the slip rate increases towards 100% slip. The rate of increase of the torque limit may be linear or nonlinear with respect to the slip rate.

The torque limit may depend on one or more simulated torque converter characteristics, including characteristics that depend on the above slip rate. Characteristics include, for example, capacity factor (Nm/rpm$^2$), and/or torque ratio (multiplication ratio), and/or efficiency. The characteristics vary based on slip rate. Equation (2) describes an example function for determining the torque limit:

$$\text{Torque limit} = (\text{Vehicle Creep Speed Target/Vehicle Speed})^2 * \text{Torque Converter Transfer Function} * \text{Automatic Transmission Ratio} \quad (2)$$

The torque converter transfer function may be based on manufacturing information for the supplied torque converter. The torque converter transfer function may comprise nonlinear functions for emulating one or more of the above-mentioned torque converter characteristics based on simulated slip rate.

Capacity factor, if accounted for in the transfer function, may be low when slip rate is low (speed ratio towards 1). The capacity factor may be higher when slip rate is high (speed ratio towards 0).

Torque ratio, if accounted for in the transfer function, may be high (>1) when slip rate is high (speed ratio towards 0). The torque ratio may be lower (approximately 1) when slip rate is low (speed ratio towards 1).

Efficiency, if accounted for in the transfer function, may be high (>80%) when slip rate is low (speed ratio towards 1). The emulated efficiency may be low when slip rate is high (speed ratio towards 0).

The automatic transmission ratio is as defined in equation (1).

For additional accuracy, fluid measurements such as operating temperature of the torque converter fluid (e.g. oil) may be received, and used to correct the torque converter capacity parameter and/or the torque converter multiplication ratio parameter. This correction simulates heat soak behaviour.

Figure 6A:
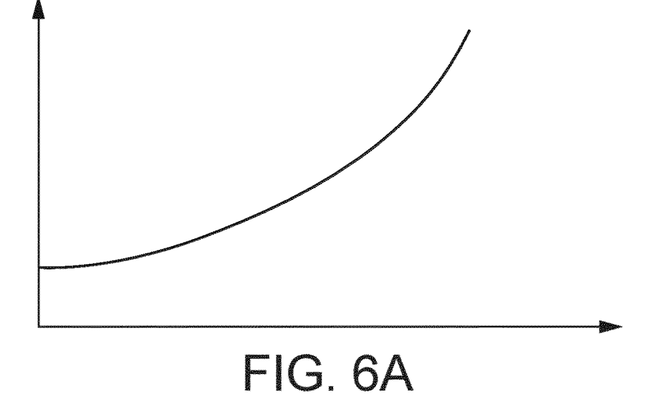
FIG. 6A illustrates an example of a graph with torque limit and engine speed axes.

FIG. 6A illustrates how the torque limit may change with respect to the simulated engine idle speed variable, while the slip rate is held constant. The torque limit increases when the simulated engine idle speed variable increases. The rate of increase of the torque limit increases as the simulated engine idle speed variable increases.

Figure 6B:
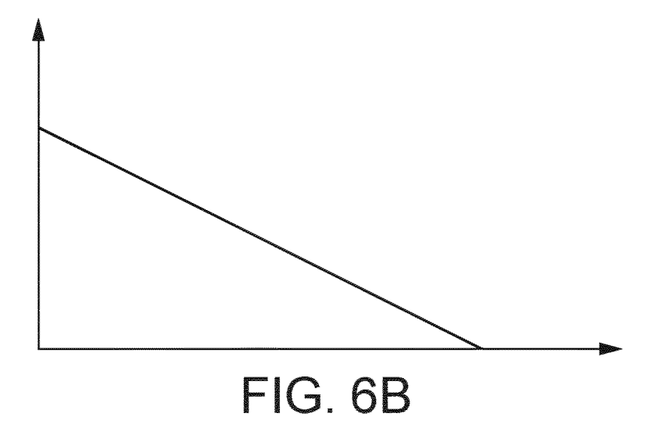
FIG. 6B illustrates an example of a graph with torque limit and vehicle speed axes.

FIG. 6B illustrates how the torque limit (y-axis) may change with respect to speed (slip) ratio (x-axis), while the simulated engine idle speed variable is held constant. The y-axis is associated with torque ratio in a torque converter. The x-axis is associated with the ratio between turbine speed and impeller speed. Torque ratio indicates torque multiplication. Slip would be maximum when the vehicle 10 is stopped and the engine 202 is idling. Slip would decrease as vehicle speed increases. Therefore, the torque limit can be seen to fall with increasing vehicle speed and rise as vehicle speed decreases.

It would be appreciated that the above functionality could be implemented using other techniques than the above-described torque limit for a speed controller. For example, the above parameters/variables/functions could be used by a torque controller to calculate a torque request or a torque setpoint rather than a torque limit. However, an advantage of the described method is that a speed controller would already be used for engine idle-based vehicle creep, so using a speed controller for the electric motor creep provides greater continuity.

The above-described method may be calibrated for the second electric traction motor 212 to replicate the torque converter characteristics sufficiently well to ensure that a vehicle speed of the vehicle creep does not change, even while the vehicle 10 is on a slope, when transitioning from the first mode to the second mode (reconnecting the torque path 220 and causing the engine 202 to enter an activated state). Therefore, the vehicle creep is not dependent on which mode the vehicle 10 is in, making the vehicle 10 feel more consistent to drive and less prone to jerk during mode transitions.

The above passages have described vehicle creep using the second electric traction motor 212. The vehicle architecture of FIG. 2 supports additional vehicle creep methods, discussed below.

When the engine 202 is active in the second mode, the engine 202 may at least partially take over providing the vehicle creep.

If the second mode is a hybrid electric vehicle mode, the second electric traction motor 212 may provide no torque, discontinuous torque, or less than all torque required for maintaining vehicle creep on level ground.

If the second mode is an engine-only mode, the second electric traction motor 212 may provide none of the torque required for vehicle creep, while the engine 202 is providing vehicle creep.

According to the vehicle architecture of FIG. 2, four-wheel drive vehicle creep is possible in the hybrid electric vehicle mode. However, it is not possible to force a specific torque distribution between the first and second sets of vehicle wheels while controlling the vehicle speed. Since the torque converter 217 can only apply torque to the first set of vehicle wheels when there is a difference between the impeller and turbine speeds, a scenario can occur wherein the vehicle creep speed target control of the second electric traction motor 212 (e.g. FIG. 5A) results in:

no torque multiplication being delivered by the torque converter 217 if the turbine speed is higher than the impeller speed; or negative torque being delivered by the electrical machine to try and slow down the vehicle 10 if the speed setpoint is too low.

To alleviate the above problem in four-wheel vehicle creep, the control system is configured to control the electric traction motor to increase tractive torque in response to falling vehicle speed causing engine speed to fall below an engine idle speed target. The engine torque is controlled based on the engine idle speed target, and the second electric traction motor torque may be controlled based on a reduced vehicle and/or engine speed target (setpoint). The second electric traction motor 212 may be prevented from providing negative torque by a saturation function if the current speed is greater than the reduced speed target. Therefore, the second electric traction motor 212 is not used except to provide positive torque when engine speed falls below the engine idle speed target, e.g. due to vehicle speed falling on up-slopes.

One way of ensuring that the reduced speed target is lower than the engine idle speed target is to add a predetermined negative offset to the engine idle speed target. Therefore, this method will work consistently even if the engine idle speed target varies in use.

The offset between the reduced speed target and the engine idle speed target may be sufficiently large for vehicle creep performance to be unaffected by small oscillations in vehicle/engine speed, but sufficiently small to ensure a contribution from the second electric traction motor 212 when vehicle/engine speed drops, to assist the vehicle 10 in four-wheel drive creep.

In another implementation, the four-wheel drive vehicle creep may be based on a vehicle speed target rather than an engine idle speed target.

For purposes of this disclosure, it is to be understood that the controller(s) 300 described herein can each comprise a control unit or computational device having one or more electronic processors 302. A vehicle 10 and/or a system thereof may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on one or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory computer-readable storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; or electrical or other types of medium for storing such information/instructions.

It will be appreciated that various changes and modifications can be made to the present invention without departing from the scope of the present application.

Each passage described as an 'aspect of the invention' is a self-contained statement suitable for a current or future independent claim, with no additional features required.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A control system for controlling movement of a vehicle to provide vehicle creep, the vehicle comprising an engine and an electric traction motor, the control system comprising one or more controllers, wherein the control system is configured to:
while a torque path between the engine and a first set of vehicle wheels is disconnected, control the electric traction motor to provide tractive torque to a second set of vehicle wheels to automatically move the vehicle to provide electric vehicle creep, wherein the torque for providing electric vehicle creep is controlled in dependence on a mathematical model of engine creep torque that would be provided by the engine when the torque path between the engine and the first set of vehicle wheels is connected.

2. The control system of claim 1, wherein the one or more controllers collectively comprise:
at least one electronic processor having an electrical input for receiving information; and
at least one electronic memory device electrically coupled to the at least one electronic processor and having instructions stored therein;
and wherein the at least one electronic processor is configured to access the at least one memory device and execute the instructions thereon so as to cause the control system to control the electric traction motor in dependence on the information.

3. The control system of claim 1, configured to control the electric traction motor to provide the electric vehicle creep while the engine is in a deactivated state.

4. The control system of claim 1, wherein the mathematical model is dependent on vehicle speed.

5. The control system of claim 1, wherein the mathematical model is dependent on at least one of: ambient temperature; operating temperature; ambient pressure; humidity; or engine accessory load.

6. The control system of claim 1, wherein the mathematical model is dependent on a simulated engine idle speed variable.

7. The control system of claim 6, wherein the mathematical model is dependent on one of a difference between, and a ratio between, the simulated engine idle speed variable and a vehicle speed variable.

8. The control system of claim 7, wherein the mathematical model is dependent on a simulated torque converter characteristic dependent on said difference or said ratio.

9. The control system of claim 1, wherein the mathematical model is dependent on one or both of: an operating temperature associated with torque converter fluid, and a simulated gear ratio for an automatic transmission operable to provide vehicle creep in different forward gears and/or in different reverse gears.

10. The control system of claim 1, wherein the automatically moving the vehicle comprises controlling the tractive torque of the electric traction motor to reduce a difference between vehicle speed and a vehicle creep speed target determined by the mathematical model.

11. The control system of claim 10, wherein the vehicle creep speed target is a function of at least: simulated engine idle speed; simulated automatic transmission ratio; differential ratio; and wheel size.

12. The control system of claim 10, wherein the mathematical model is configured to limit the tractive torque of the electric traction motor, based on the modeled engine creep torque, to enable an external environment to slow the vehicle.

13. The control system of claim 12, wherein the controlling the tractive torque to enable the external environment to slow the vehicle comprises saturating the tractive torque of the electric traction motor to a torque limit determined by the mathematical model, wherein the torque limit is configured to enable the vehicle speed to reach the vehicle creep speed target when the vehicle is on level ground and is configured to cause the vehicle speed to be incapable of reaching or maintaining the vehicle creep speed target when the vehicle is on an up-slope.

14. The control system of claim 13, wherein the torque limit is a function of at least: the vehicle creep speed target; vehicle speed; simulated automatic transmission ratio; and a torque converter transfer function that emulates, as a function of slip ratio, capacity factor and/or torque ratio and/or torque converter efficiency.

15. The control system of claim 14, wherein the torque limit is defined according to the equation:

$$\text{Torque limit} = (\text{Vehicle Creep Speed Target}/\text{Vehicle Speed})^2 * \text{Torque Converter Transfer Function} * \text{Automatic Transmission Ratio}.$$

16. The control system of claim 1, configured to:
  receive a signal indicative of a requirement to transition the engine from a first mode to a second mode during electric vehicle creep, wherein in the first mode the engine is in a deactivated state and the torque path is disconnected and the electric traction motor provides electric vehicle creep, and wherein in the second mode the engine is in an activated state and the torque path is connected and the engine provides, at least in part, vehicle creep; and
  cause connection of the torque path and activation of the engine in dependence on receiving the signal.

17. The control system of claim 16, wherein the first mode is an electric vehicle mode and the second mode is a hybrid electric vehicle mode, wherein in the hybrid electric vehicle mode the electric traction motor is operable to provide tractive torque to the second set of vehicle wheels, and wherein the control system is configured to control the electric traction motor to increase tractive torque in response to falling vehicle speed causing engine speed to fall below an engine idle speed target.

18. A vehicle comprising the control system, the engine and the electric traction motor of claim 1.

19. A method of controlling an engine and an electric traction motor of a vehicle, the method comprising:
  while a torque path between the engine and a first set of vehicle wheels is disconnected, controlling the electric traction motor to provide tractive torque to a second set of vehicle wheels to automatically move the vehicle to provide electric vehicle creep, wherein the torque for providing the electric vehicle creep is controlled in dependence on a mathematical model of engine creep torque that would be provided by the engine when the torque path between the engine and the first set of vehicle wheels is connected.

20. A non-transitory, computer-readable medium having stored thereon computer software that, when executed, is arranged to perform the method according to claim 19.

* * * * *